(No Model.) 2 Sheets—Sheet 1.

J. MÜLLER.
MACHINE FOR SEPARATING HOP SCALES FROM THEIR STEMS.

No. 314,146. Patented Mar. 17, 1885.

WITNESSES:
Jno. N. Rosenbaum.
Otto Risch.

INVENTOR
Jacob Müller
BY
Goepel & Raegener
ATTORNEYS.

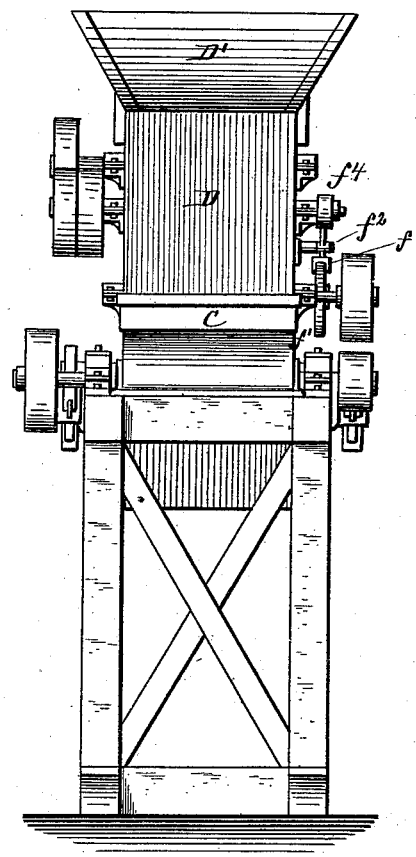

United States Patent Office.

JACOB MÜLLER, OF NEW YORK, N. Y.

MACHINE FOR SEPARATING HOP-SCALES FROM THEIR STEMS.

SPECIFICATION forming part of Letters Patent No. 314,146, dated March 17, 1885.

Application filed September 20, 1884. (No model.)

*To all whom it may concern:*

Be it known that I, JACOB MÜLLER, of the city, county, and State of New York, have invented certain new and useful Improvements in Machines for Separating Hop-Scales from their Stems, of which the following is a specification.

This invention has reference to certain improvements in the machine for separating hop-scales from their stems for which Letters Patent have been granted to me heretofore, numbered 285,150, and dated September 18, 1883, the improvements being designed with a view to facilitate the uniform feeding of large quantities of hops to the separating-rollers; and the invention consists, first, of mechanism for separating the hop-scales from their stems, the casing having a supply-opening above said separating mechanism, a hopper located above said casing and having a lateral extension, rotating agitators located in said hopper, a feed-belt arranged in the hopper-extension, and means for intermittently moving the feed-belt. The invention consists, secondly, of two rotating rollers located close together and provided with projecting teeth for separating the hop-scales from their stems, a hopper above the rollers, rotating agitators located in said hopper for loosening the hops, an endless belt located in an extension of the hopper, and means for intermittently moving the belt forward for feeding the hops to the agitators and separating-rollers.

Figure 1:
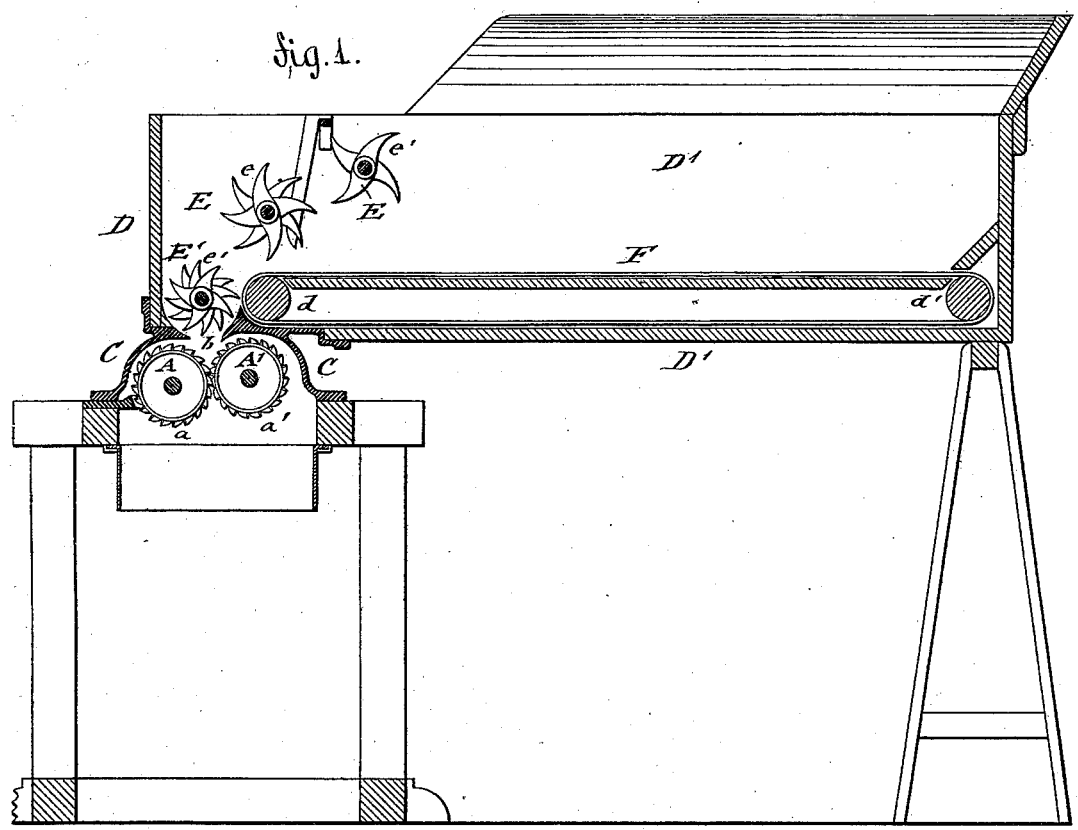
Figure 2:
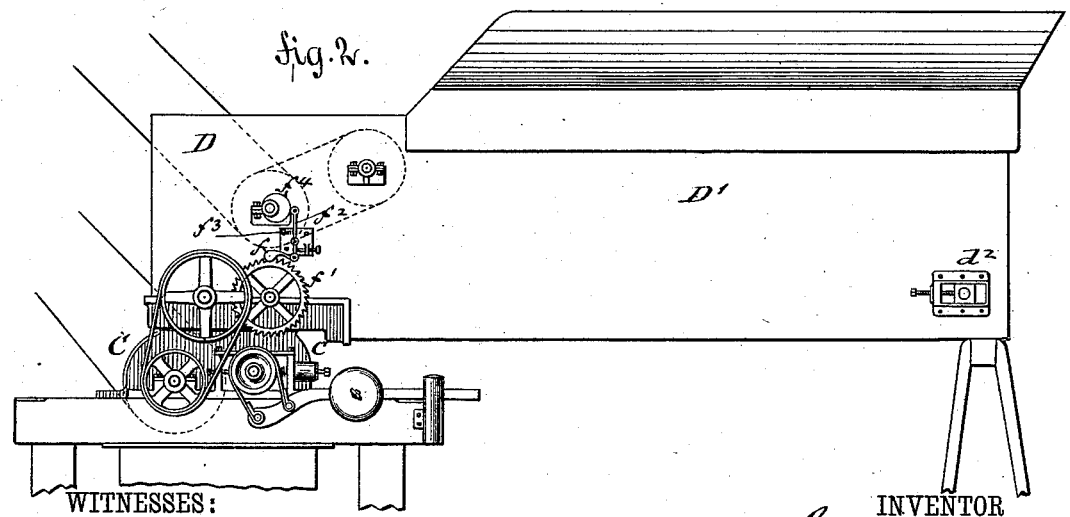

In the accompanying drawings, Figure 1 represents a vertical longitudinal section of my improved machine for separating hop-scales from their stems; Fig. 2 a side elevation, and Fig. 3 an end elevation.

Similar letters of reference indicate corresponding parts.

A A' in the drawings represent two cylindrical rollers, which are arranged close to each other, and provided on their circumference with rows of projecting teeth that are sharpened at their one edge, said teeth $a$ $a'$ being arranged in alternating rows in such a manner that the teeth of one roller pass through the interstices between the teeth of the other roller. The shaft of the roller A is supported in stationary bearings, while the shaft of the roller A' is supported in spring-cushioned bearings, and provided with a brake device, as will more fully appear in the patent hereinbefore referred to. The roller A is quickly rotated by a belt-and-pulley transmission from a power-shaft overhead. A cast-iron casing, C, incloses the upper part of the rollers A A', the casing having a transverse feed-opening, $b$, vertically above the line of contact of the rollers, as shown in Fig. 1.

On the casing C is supported a hopper, D, to which the hops are discharged from the bale. The hops are taken up first by two agitators, E E, that are arranged in the hopper D, and rotated quickly in opposite directions to each other, said agitators being provided with curved teeth or spurs $e$ $e$, that serve to loosen the lumps of hops which are formed in the bale when the hops are compressed for shipment. A third agitator, E', having smaller teeth or spurs $e'$, is arranged above the feed-opening $b$ of the casing C, intermediately between the agitators E E and the separating-rollers A A', the agitator E' serving to supply the loosened hops evenly to the rolls A A'. The agitators E E are rotated by transmitting pulleys and belts from the power-shaft, while the agitator E' is rotated by a belt-and-pulley transmission from the shaft of the roller A. A horizontal feed-belt, F, is arranged in a lateral extension, D', arranged at one side of the hopper D, the belt being stretched over rollers $d$ $d'$, of which the roller $d'$ is supported in adjustable bearings $d^2$. The driving-roller $d$ is intermittently rotated by a pawl, $f$, and ratchet-wheel $f'$, the pawl $f$ being pivoted to a fulcrumed lever, $f^2$, that is pressed by a spring, $f^3$, against an eccentric, $f^4$, on the shaft of one of the agitators E, as shown in Fig. 2. The belt F is thereby slowly moved forward, so that the hops on the hopper-extension D' are gradually fed to the agitators E E', and thence to the separating-rollers A A'. Any other suitable mechanism for moving the feed-belt forward may be employed.

The hopper-extension D', with its feed-belt F, has the advantage that a bale of hops can be discharged at one time into the hopper D D', and slowly fed to the agitators, which break up the compressed hops and keep up a uniform supply to the separating-rollers without any danger of clogging the same by lumps of too great size.

Having thus described my invention, I claim as new and desire to secure by Letters Patent—

1. A machine for separating hop-scales from their stems, which comprises mechanism for separating the hop-scales from their stems, a casing having a supply-opening above said separating mechanism, a hopper located above said casing and having a lateral extension, rotating agitators located in said hopper, a feed-belt arranged in the extension of said hopper, and means for intermittently moving the feed-belt, substantially as set forth.

2. The herein-described machine for separating hop-scales from their stems, consisting of a rotating roller, a second roller the shaft of which is supported in spring-cushioned bearings, both rollers having alternating circumferential rows of teeth, the teeth of one roller passing through the interstices of the other, a casing having a supply-opening above said rollers, a hopper supported on said casing and having a lateral extension, rotating agitators located in said hopper, a feed-belt located in said extension, and means for intermittently moving the feed-belt forward, substantially as set forth.

In testimony that I claim the foregoing as my invention I have signed my name in presence of two subscribing witnesses.

JACOB MÜLLER.

Witnesses:
   PAUL GOEPEL,
   SIDNEY MANN.